Patented June 23, 1942

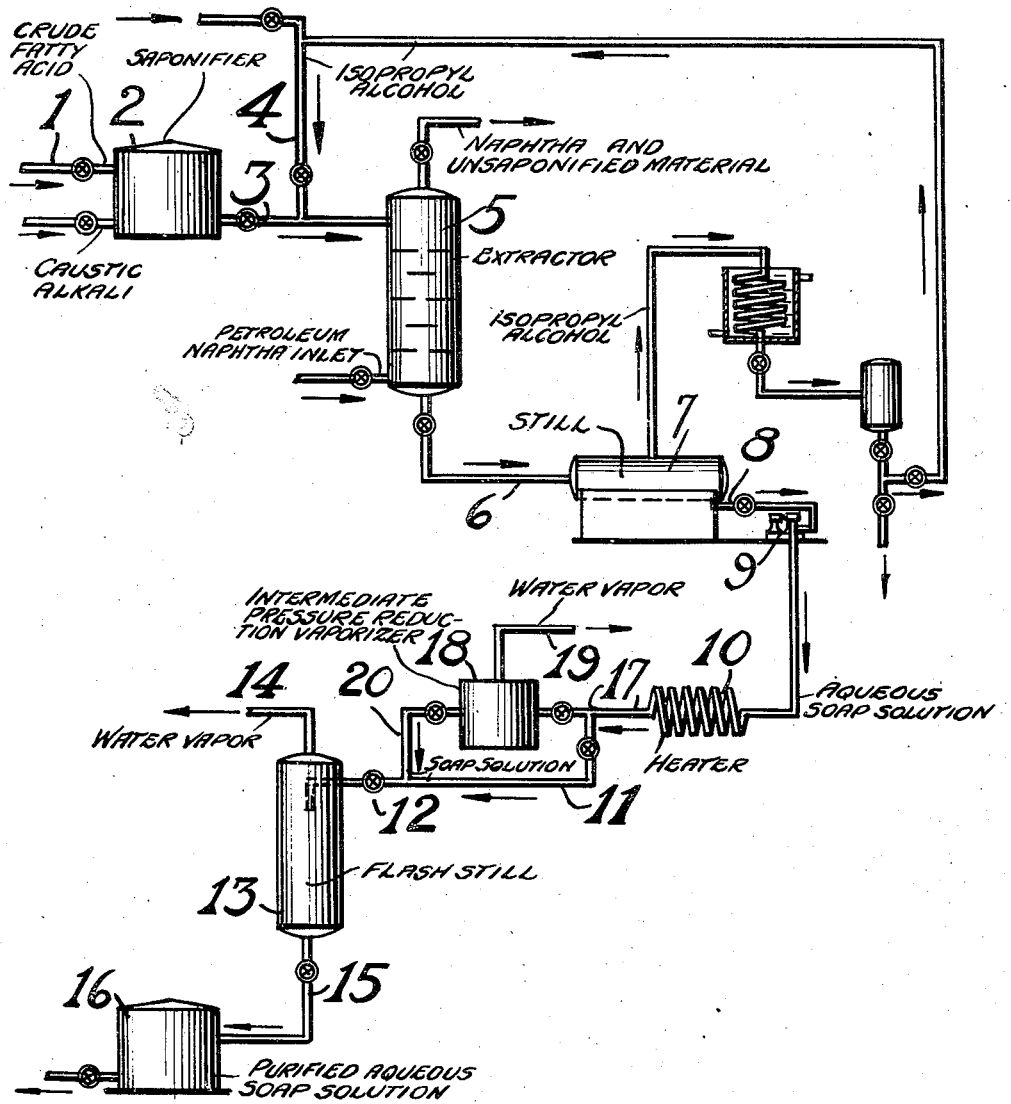

2,287,128

UNITED STATES PATENT OFFICE 2,287,128

PROCESS FOR PURIFYING FATTY ACIDS

Louis E. Pirkle, Baton Rouge, La., assignor to Jasco, Incorporated, a corporation of Louisiana Application July 23, 1938, Serial No. 220,912

5 Claims. (Cl. 260—452)

This invention relates to an improved process for the purification of crude soaps. It relates more particularly to the purification of synthetic soaps such as those obtained from synthetic fatty acids prepared by oxidizing hydrocarbon oils and waxes.

The synthetic fatty acids prepared by the limited oxidation of paraffin wax contain odorous and unstable constituents. These acids must be highly purified in order to be suitable for use in toilet soaps. Such purification is only partly accomplished in the removal of unsaponifiable materials from the crude oxidation products. It has now been found that soaps of greatly improved odor and purity are prepared by subjecting an aqueous solution of the crude soaps, after removal of unsaponified matter, to a flash distillation.

The drawing is a diagrammatic elevation, partly in section, of suitable apparatus for carrying out the process of this invention and indicates the flow of materials.

Referring to the drawing, a partially oxidized hydrocarbon material containing synthetic fatty acids is provided by line 1. This material may be prepared by subjecting relatively non-aromatic liquid or solid hydrocarbons, such as crude scale wax, sweater oil, petrolatum, Diesel oils, tar products and products obtained by distillation, extraction, cracking, hydrogenation and destructive hydrogenation of such materials, to a limited oxidation. The oxidation is preferably conducted with the paraffin wax or other suitable initial material in liquid phase and in the presence of a catalyst such as barium and manganese soaps, using air at atmospheric or slightly elevated pressure. The treatment is conducted at temperatures of about 100 to 150° C. until a large proportion of volatile or distillable fatty acids of the molecular weight range used for soap making is obtained.

This crude oxidation product is passed into a pressure saponifier 2 where it is saponified by heating at temperatures of about 80 to 150° C. under pressure with aqueous caustic or soda ash in slight excess until the reaction is substantially complete. The resulting mixture is then removed by line 3 and is cooled with the addition of isopropyl alcohol by line 4. The cooled mixture is then passed through the tower 5 in which it is subjected to countercurrent extraction with naphtha in order to remove the unsaponified materials. These extracted materials may be separated from the naphtha and returned to the oxidation treatment with additional fresh wax.

The raffinate is withdrawn from the tower 5 by line 6 and is passed into the still 7, in which it is heated with closed steam or other suitable source of heat. The alcohol and any small amounts of naphtha present are distilled off with a portion of the water and may be recycled to the line 4. The aqueous soap solution, concentrated by this distillation treatment to a soap content of about 20 to 40%, is withdrawn by the line 8 and is forced by high pressure pump 9 through the fired coil 10 in which it is heated to a temperature of about 275 to 325° C. under sufficient pressure to maintain it substantially completely in the liquid phase. The heated mixture is then passed by line 11 through pressure reduction valve 12 into a vessel 13 which is maintained at a low pressure, suitably atmospheric, and which is provided with line 14 for escape of vapors. Under these conditions about 25 to 75% of the water present in the soap solution charged to the coil 10 is flashed off as vapor from the vessel 13. The residue from this flashing operation is a soap solution still containing substantial amounts of water. It is withdrawn by line 15, cooled and passed to receiving vessel 16.

The odorous impurities present in the crude soap solution are removed with the steam in the flashing operation. This flashing operation may also be conducted with pressure reduction in two or more stages. For example, the heated soap solution leaving the fired coil 10 may be passed by line 17 into a pressure vessel 18, which is maintained at a substantially lower pressure than the coil outlet. Vapors liberated in this vessel are removed by line 19, the liquid being withdrawn by line 20 and passed either through additional vessels at successively lower pressures are directly into vessel 13. In this manner, a substantial proportion of the steam vaporizing on reduction of pressure is removed in the intermediate steps without foaming and the elimination of odorous impurities from the soap is somewhat further improved.

The purified soap solution obtained in 16 consists of soaps of a mixture of acids varying in molecular weight and volatility. These acids may be separated into narrow fractions corresponding in volatility, molecular weight and other characteristics to any desired fraction of the fatty acids normally used for soap making. For example, the soap solution in 16 may be acidified with a dilute mineral acid such as sulphuric acid. The fatty acids liberated by this treatment separate from the aqueous acids and may be further separated into fractions by distillation, preferably conducted with steam under a vacuum of about 2 to 10 mm. absolute pressure.

The following example illustrates a suitable method for carrying out the process of this invention:

*Example*

Paraffin wax derived from petroleum is oxidized by blowing with air at about 100 to 150° C. in the presence of oxidation catalysts such as barium and manganese soaps, at atmospheric pressure until the oxidized wax has an acid number of about 65. This oxidized product is then saponified by heating under pressure with a slight excess of aqueous alkali at a temperature of about 170° C. The resulting mixture is then diluted with isopropyl alcohol (to avoid emulsification) and is extracted with several volumes of petroleum naphtha to remove unsaponified materials. The raffinate is then heated to distill off the isopropyl alcohol which is recovered, leaving a distillation residue containing about 30% soap. This soap solution is then heated in an autoclave to a temperature of 300° C. as rapidly as possible and the heated liquid is thereupon discharged into an open vessel at atmospheric pressure. About 35% of the water present in the heated solution is thus flashed off as vapor. The residual soap solution remaining in this open vessel contains about 40% of a purified soap. This soap solution is acidified with dilute sulphuric acid and the fatty acid layer separating is withdrawn, washed free of mineral acid and steam distilled under vacuum at 10 mm. absolute pressure in a "Wecker" still, using a maximum liquid temperature of about 260 to 280° C. The first 10% distillate fraction contains lower fatty acids. The next fraction, amounting to about 65 to 70% of the feed to the still, is a mixture of acids suitable for soap making. This fraction contains fatty acids of about 10 to 20 carbon atoms per molecule, averaging about 16 carbon atoms. The soda soap made from this distillate fraction is substantially white in color and is practically odorless.

In comparison with the above, a similar soda soap made by the same process, except that the flash distillation treatment was omitted, was appreciably darker in color and had an appreciable, undesirable odor.

The present method, in which the major portion of the unsaponifiable matter is separated from the soap solution prior to the flashing operation on this solution, is greatly superior to previously suggested operations in which the unsaponifiable matter is separated directly from the soap by distillation with steam. The high temperatures necessary for distillation of the unsaponifiable matter is injurious to the quality and to the yield of acids from the soaps. The soap also undergoes some degree of decomposition at these temperatures which results in products of a poorer color than are obtained by the present process. Also, the residue resulting from the distillation of the unsaponifiable material is substantially anhydrous. The necessity of dissolving this anhydrous soap in water prior to the liberation of the fatty acids presents an additional complication over the present process.

This invention is not to be limited by any examples or theoretical explanations of the operation of the process, all of which are presented solely for purpose of illustration, but is to be limited only the following claims in which it is desired to claim all novelty insofar as the prior art permits.

I claim:

1. Process for the purification of soaps of crude synthetic fatty acids prepared by oxidation of hydrocarbons comprising heating an aqueous solution of said crude soaps containing at least 60% of water, under its own vapor pressure to a temperature of about 275 to 325° C. and then subjecting the heated solution to a flash vaporization, whereupon a substantial portion of the water contained therein is vaporized together with impurities and there is recovered as the flash vaporization residue a concentrated aqueous solution of the purified soaps.

2. Process for preparing purified soaps of crude synthetic fatty acids obtained by limited oxidation of non-aromatic hydrocarbons, comprising neutralizing the oxidation product with aqueous alkali, separating from the neutralized mixture the unsaponifiable matter present in the said oxidation product, heating the remaining aqueous solution of crude soaps, containing at least 60% of water, in liquid phase to a temperature of about 275 to 325° C. and then subjecting the heated solution to flash vaporization, whereupon a substantial proportion less than 75% of the water present is vaporized together with contained impurities and there is recovered as the flash vaporization residue a concentrated aqueous solution of purified soaps.

3. Process for preparing soaps of high purity, comprising subjecting a petroleum wax to limited catalytic oxidation in liquid phase at a temperature of 100 to 150° C., saponifying the oxidation product with aqueous alkali at a temperature of about 150° C. under pressure, separating unsaponified matter from the saponification product by extraction, heating the resulting aqueous solution of crude soaps, containing at least 60% of water, in liquid phase to a temperature of about 300° C., then quickly reducing the pressure on the heated solution, whereupon a substantial proportion of the water present is vaporized by the heat content of the solution and there is recovered as the unvaporized residue a concentrated aqueous solution of purified synthetic soaps.

4. Process according to claim 3 in which the pressure on the said heated solution is reduced in a plurality of of consecutive steps and the vapors resulting on each reduction in pressure are separately removed from contact with the liquid before the liquid is passed to the next pressure reduction stage.

5. Process for preparing soaps of high purity comprising subjecting a petroleum wax to limited oxidation in liquid phase to produce a crude oxidation product containing fatty acids, neutralizing said fatty acids with aqueous alkali to produce an aqueous solution having a soap content of about 20 to 40%, separating unsaponified and unsaponifiable matter from the resulting aqueous solution of crude soaps, heating the remaining aqueous solution of crude soaps in liquid phase to a temperature of about 275 to 325° C. and then subjecting the heated solution to flash vaporization to vaporize about 25 to 75% of water in the said heated solution together with impurities therein, separately withdrawing the resulting vapors and recovering as the flash vaporization residue a concentrated aqueous solution of purified soaps.

LOUIS E. PIRKLE.